Aug. 25, 1970          J. BRONSON          3,525,461
CAR TOP CARRIER STRUCTURE WITH LOCKING MEANS
Filed May 27, 1968
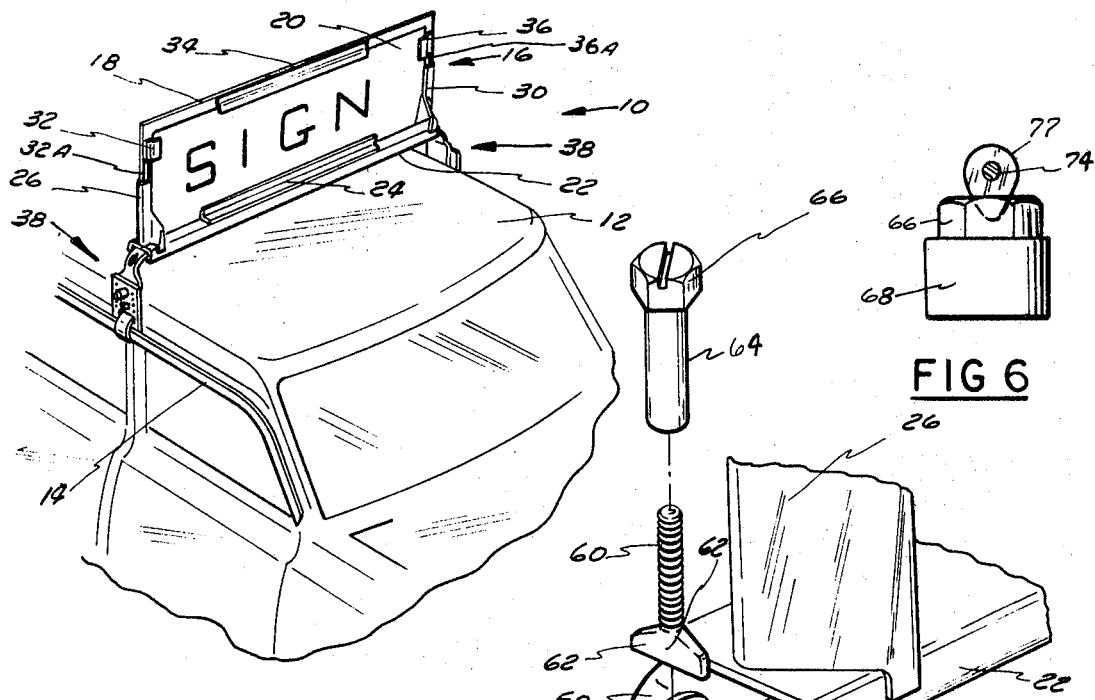
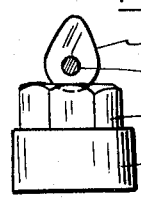
INVENTOR
JOSEPH BRONSON
BY
Hawke Kraus Gifford & Patalidis
ATTORNEYS United States Patent Office 3,525,461
Patented Aug. 25, 1970

3,525,461
CAR TOP CARRIER STRUCTURE WITH LOCKING MEANS
Joseph Bronson, 15397 Cruse Ave.,
Detroit, Mich. 48227
Continuation-in-part of application Ser. No. 631,569, Mar. 31, 1967. This application May 27, 1968, Ser. No. 732,378
Int. Cl. B60r 9/04
U.S. Cl. 224—42.1        14 Claims

ABSTRACT OF THE DISCLOSURE

A carrier structure is disclosed for supporting advertising material above the roof of an automobile. The structure includes a frame for the material which mounts transversely of the roof by a pair of clamping devices that are attachable with the rain gutters along the sides of the roof. A key-operated lock on each clamping assembly prevents unauthorized removal of the carrier structure from the vehicle.

CROSS-REFERENCE TO RELATED APPLICATIONS

This application is a continuation-in-part of application Ser. No. 631,569 filed Mar. 31, 1967 and now U.S. Pat. No. 3,385,488.

BACKGROUND OF THE INVENTION

Field of the invention

This invention relates to carrier structures which are temporarily fastened to the exterior of a vehicle, and more specifically to a structure of this character having clamping means which are attachable to the vehicle with key-operated locking means for preventing the unauthorized detachment of the structure from the vehicle.

Description of the prior art

Numerous structures have been disclosed in the prior art for supporting articles on the exterior surfaces of an automotive vehicle. Normally the manner in which the structure is mounted depends on the article that is to be supported; for instance, car top carriers are mounted on the vehicle's roof to transport articles that cannot be accommodated within the interior of the vehicle. Other carrier structures are mounted on the deck lid of the vehicle to support skis and the like, which are also of such a size that they cannot be readily accommodated within the interior of the vehicle. Still other structures have been disclosed in the art for supporting advertising material on the roof of the vehicle.

One common problem with conventional carrier structures has been related to a fastening device that can be inexpensively formed with a relatively few components to provide a firm connection between the structure and the vehicle. My aforementioned patent discloses such a fastening means in the form of a clamping device which is engageable with the rain gutters of a conventional automobile. The improved clamping devices are mounted in pairs, one on each side of the roof of the vehicle to support a car top carrier frame on which an article that is to be transported by the vehicle can be mounted.

A problem that has been related to conventional carrier structures is that they are usually rather expensive. When attached to the roof of an unattended vehicle, they can be removed by unauthorized parties from the vehicle.

SUMMARY OF THE PRESENT INVENTION

The broad purpose of the present invention is to provide a structure for supporting advertising material in an upright position above the vehicle's roof and which is connected to the vehicle by a pair of clamping devices which engage the rain gutters along the side of the roof. The clamping devices of the preferred embodiment are similar to the clamping devices disclosed in my aforementioned patent.

Another object of the present invention is to provide a clamping device for attaching a carrier structure or the like, to a vehicle with key-operated lock means for preventing the unauthorized disengagement of the clamping device from the vehicle.

The preferred embodiment of the present invention, which will be subsequently described in greater detail, comprises a frame having a base member with a length which substantially corresponds to the distance between the rain gutters along the sides of the vehicle's roof. The frame is adapted to support a panel on which advertising material is displayed. A clamping device, connected to each end of the base of the frame is adapted to support the frame and the display panel in an upright position above the vehicle's roof.

Each clamping device comprises a plate-like clamping member attached to the end of the frame and which is mounted in an upstanding position with it lower, clamping edge in the trough of the rain gutter. The clamping member also has an opening adjacent its lower edge in which is supported an elongated metal strap having its lower end formed into a hook. The hook extends outwardly through the opening and is engageable with the lower side of the rain gutter.

A pair of threaded fasteners, mounted on the inner side of the clamping member, and engageable with a screwdriver are connected with the upper end of the strap so that when the hook is located against the lower side of the gutter, the fastener members can be tightened by the screwdriver, to pull the strap upwardly until the rain gutter is tightly clamped between the clamping member and the rock. The frame for supporting the sign structure is then rigidly mounted in place.

The clamping member has an access opening to its inner side for the screwdriver to engage the head of the upper fastener to either loosen or tighten the clamping hook. The clamping member also has a socket between the access opening and the head of the fastener for receiving a key-operated lock. The lock has a finger eccentrically mounted on its inner end formed with a pair of cam lips and a head. When the lock is mounted in its socket, the finger is disposed between the access opening and the head of the fastener. When the lock is operated by the key, the head of the finger rotates to engage the head of the fastener, one cam lip rotates to wedge the side of the fastener head and the second cam lip rotates to a position preventing removal of the lock from its socket. When the key is removed, the lock with the finger prevents any tool from being engaged with the head of the fastener lock and the two cam lips and the head of the finger are rotated to a position preventing removal of the lock from the clamping member.

In summary, the preferred embodiment of the invention comprises a novel carrier structure for mounting an advertising sign transversely of the vehicle's roof by a pair of clamping devices that can be quickly and easily attached to the rain gutters along the sides of the roof. In addition, key-operated lock means on each of the clamping devices prevent the carrier from being removed from the roof by a party who does not have the proper key.

Still further advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views and in which:

FIG. 1 is a perspective view showing a preferred carrier structure supporting a display panel above the roof of a vehicle and connected to the rain gutters along the sides of the roof;

FIG. 2 is an enlarged view of one end of the carrier structure with parts of the clamping device illustrated in an exploded relationship;

FIG. 3 is a sectional view through the preferred clamping device with the key-operated lock mounted in its socket in its unlocked condition;

FIG. 4 is a transverse sectional view through the sign structure;

FIG. 5 is a view of the lock as seen along lines 5—5 of FIG. 4; and

FIG. 6 is a view, similar to FIG. 5, but showing the lock in its locked condition.

DESCRIPTION OF THE PREFERRED EMBODIMENT

Referring to the drawings, FIG. 1 illustrates a preferred sign structure generally indicated at 10 supported above the roof of a conventional automotive vehicle 12 and connected to a pair of rain gutters 14 (only one of which is shown) which run along the sides of the roof. The sign structure 10 includes a frame 16 and a rectangular display panel 18 mounted on the frame for removably supporting advertising material 20. The advertising material 20 is mounted transversely of the roof of the vehicle and normally is intended to display advertising material on a non-moving vehicle, such as automobiles in a used car lot.

Referring to FIGS. 1 and 4, the frame 16 comprises an elongated base member 22 having a channel-shaped cross section and a length slightly less than the distance between the rain gutters. A pair of elongated angle members 24 are fixedly mounted to the mid-section of the base member 22 to form a channel-shaped section or slot for receiving the lower edge of the panel 18. A pair of side members 26 and 30 are fixed in an upright position at each end of the base 22 and also have a channel-shaped cross section for receiving the sides of the panel 18.

The advertising material 20 is usually formed on a suitable, relatively stiff sign board material which is attached by fastener means 32, 34 and 36 to the panel 18 and provides a stiff, back-up board for the advertising material. Fastener means 32 and 36 are formed of metal and have an elongated portion 32A and 36A respectively which brace the sides of the panel 18. The panel 18 can be inserted between the side members 26 and 30 and secured to the frame 16 by a suitable fastener (not shown).

Referring to FIG. 2, a pair of clamping devices generally indicated at 38, attach the end of the base member 22 of the frame to the rain gutters 14 and also support the frame 16 in an upright position. Each clamping device includes a plate-like clamping member 40 having a pair of vertical stiffening ribs 42 and a lower clamping edge 44 which is engageable with the trough of the rain gutter 14. The clamping edge 44 is slightly bent outwardly as best seen in FIG. 3 in order to provide a better connection with the rain gutters of modern vehicles. The clamping member 40 has an opening adjacent its lower clamping edge 44 and an opening which forms a socket 48 adjacent its upper edge.

A connecting plate 50 has one end fixedly attached to the base member 22 and its other end connected to the clamping member 40 by a series of fastener means 51. The fastener means are received in openings 51A in the clamping member 40 and similar openings (not shown) in the connecting plate 50 which allow the frame 16 to be mounted a selected height above the rain gutters 14. This adjustability allows the supporting structure to accommodate vehicles having different roof heights. When the clamping member 40 on each side of the roof is mounted in an upstanding position in the rain gutter 14, the frame 16 is disposed in an upright position.

The clamping device 38 also includes a metal strap 52 which functions as a second, cooperating clamping member having its lower end formed into a hook 54 which is engageable with the lower side of the rain gutter 44. The strap 52 is supported with its mid-section extending through the opening 46 of the clamping member so that the hook 54 is movable toward and away from the clamping edge 44, between a clamping position in which it engages the lower side of the gutter 14 and a release position in which it is spaced from the gutter and generally disposed adjacent the outer side of the clamping member 40. The upper end 56 of the strap 52 is normally disposed on the inner side of the clamping member 40 and bent into a hook-shaped section 56 having a slot 58 formed in the middle of the bend and extending parallel to the longitudinal axis of the strap.

A fastener member 60 has a pair of laterally extending feet 62 on its lower end which are receivable in the slot 58 when they are parallel to the slot. By turning the fastened member 60 so that the arms 62 are transverse to the longitudinal axis of the strap, the feet 62 provide means for pulling the strap upwardly.

A second fastener member 64 has an elongated body threadably engaged with the fastener 60 and a head 66 seated on a shoulder 68 which is fixed on the inner side of the clamping member 40. The head 66 is engageable with a screwdriver (not shown) which provides means for applying an effort on the fastener 64 for either clamping or releasing the device from the gutter 14. When the fastener 64 is rotated in one direction, the feet 62 are prevented by the hook-shaped end 56 from rotating so that they draw the strap 52 upwardly which causes the hook 54 to tightly engage the lower side of the gutter 14 below the clamping edge 44. As the strap 52 is drawn upwardly its back side abuts the clamping member 40 so that the hook 54 is rigidly held in position.

By rotating the fastener member 64 in its reverse direction, the feet 62 of the lower fastener are moved away from the head 66 and this allows the hook 54 to be moved away from the edge 44 of the clamping member 40 and to be separated from the gutter 14 so that the clamping device can be detached from the vehicle.

The connecting member 50 has an access opening 70 formed above the shoulder 68. In order to release or clamp the clamping device 38 to the gutter, the screw driver for applying the clamping or releasing effort must be inserted through the opening 70.

A key-operated lock 72 having a latch finger 74 on its inner end is mountable in the socket 48. When the lock is inserted in the socket 48, the finger 74 has an eccentrically formed head 76 disposed above the head 66 of the fastener in a position which prevents a tool inserted in the opening 70 from operatively engaging the head 66 of the fastener member. The finger also has an eccentrically formed cam 77 having an inner surface 78 and an outer surface 80. A key 82 which may be separably joined to the lock is operative to rotate the finger about 180 degrees from an unlocked position to a locked position. The lock 72 also has a lip 84 which is engageable with the upper edge of the clamping member 40 to prevent rotation of the lock in its socket.

Referring to FIGS. 2, 5 and 6, the lock is normally inserted in the socket 48 with the cam 77 in an upright position so that it passes through a shaped portion 86 of the socket 48. The lock is inserted until it is located by the lip 84 engaging the upper edge of the clamping member 40. The key 82 is then rotated so that the head 76 of the finger moves down to clamp the head 66 against the shoulder 68. As the finger 74 is rotated by the key 82, the inner cammed surface 78 of the cam 77 is wedged against the side of the head 66 so that the head cannot effectively be engaged by either a screw driver or a wrench or other tool. The surface 80 also rotates eccentrically to a position behind the upper edge of the clamping member 40 which prevents the lock from being removed from the socket.

The key 82 can then be separated from the lock 72 leaving the clamping device in its clamping position and locked against removal. Insertion of the proper key in the lock 72 to rotate the finger 74 in the opposite direction allows the lock to be removed from its socket. The lock 72 is removably mounted in the socket 48 and operated by a key 82 which separates from the lock. The key 82 has a coded contour in the conventional manner so that a party not having a similarly contoured key cannot operate the lock and thereby release the clamping device 38 from the vehicle.

Thus it is to be understood that I have described a novel sign structure that can be mounted on the roof of a vehicle and firmly clamped to the rain gutters on each side of the roof. Key-operating locking means on the clamping means prevent an unauthorized party from removing the sign structure from the vehicle. The key-operated locking feature of the preferred embodiment can be employed to prevent the removal of other types of carrier structures that are attached to other exterior portions of a vehicle as, for example, a ski carrier that is mounted on the deck lid of the vehicle and clamped to the edge of the deck lid structure or the like.

Although I have described but one embodiment of my invention, it is to be understood that various changes and revisions can be made therein without departing from the spirit of the invention.

I claim:

1. A theft-proof clamping assembly for attaching an article to a vehicle structure, comprising:
    a first clamping member having a clamping section engageable with a vehicle structure;
    a second clamping member having a clamping section engageable with the vehicle structure and mounted on said first clamping member for motion between a first position in which the second clamping member cooperates with the first clamping member to attach the first clamping member to the vehicle structure, and a second position in which the second clamping member allows the first clamping member to be detached from the vehicle structure;
    fastener means movably mounted between said first and second clamping members for maintaining said second clamping member in said first position;
    means for connecting an article which is to be supported on the vehicle structure to at least one of said clamping members;
    a key-operated lock on one of said clamping members having an element movable by operation of the lock by a key which separates from the lock between a first position in which said element is operative to prevent motion of said fastener means and said second clamping member from its first position when engaged with the vehicle structure, and a second position in which said element is inoperative to prevent motion of said fastener means and said second clamping member from its first position.

2. The invention as defined in claim 1, in which said first and second clamping members are adapted to engage the rain gutter on the roof of an automobile.

3. The invention as defined in claim 1, in which the first clamping member is adapted to be mounted in a normally, substantially horizontal portion of the vehicle structure to support the article above said vehicle structure.

4. The invention as defined in claim 1, wherein the clamping assembly is attached to the edge portion of a structure of the vehicle having a substantially uniform thickness between first and second sides, and wherein said first clamping member is engageable with one of said sides of said edge portion and the second clamping member is engageable with the opposite side of the edge portion, and is movable toward and away from the first clamping member and a clamping position in which the edge portion of the vehicle structure is clamped between said clamping members.

5. The invention as defined in claim 4, wherein the first clamping member has a generally plate-like structure with a lower clamping edge and is mountable on the vehicle structure with its clamping edge engaged with the first side of the edge portion to support the plate-like structure of the first clamping member and in a position generally normal to said one side, and the second clamping member comprises a generally rigid elongated strap having one end formed into a hook; and including means mounting said strap on the first clamping member so that the hook extends around the edge portion of the vehicle structure with its curved inner side engaged with the second side of the edge portion; and said fastener means clamping the edge portion between the clamping edge of the first clamping member and the hook of the second clamping member.

6. The invention as defined in claim 5, wherein said fastener means connect the strap and the first fastener member and are movable in first and second directions, so that motion of the fastener means in the first direction moves the hook toward the clamping edge of the first clamping member and motion of the fastener means in the second direction allows the hook to be separated from the edge portion of the vehicle; said fastener means being engageable with a tool for applying an effort effective to move the fastener means in its first and second directions, and wherein the element of said key-operated lock is operable to prevent engagement of the tool with the fastener means.

7. The invention as defined in claim 6, including socket means on the first clamping member for removably supporting the key-operated lock and wherein insertion of the lock in the socket means disposes said element in a latch position in which it prevents engagement between the tool and the fastener member, and manipulation of the lock by its key prevents removal of the said element from its latch position.

8. The invention as defined in claim 1, wherein the clamping assembly is attachable to an automotive vehicle having a roof with a rain gutter running along its lateral side; said first clamping member is formed of a plate-like section having a lower clamping edge engageable with the trough of the rain gutter to support the first clamping member in an upstanding position and has an opening spaced from its lower clamping edge; and said second clamping member comprises an elongated substantially rigid strap having one end bent to form a hook and its opposite end adapted for connection to said fastener means; said strap being movably supported in the opening in the first clamping member with the hook substantially on the outer side of the first clamping member and movable toward and away from the clamping edge of the first clamping member, and the opposite end of the strap being on the inner side of the first clamping member, and including said fastener means being on the inner side of said first clamping member and connected to said strap operable to move the strap so that the hook moves toward the clamping edge of the first clamping member and the lower side of the rain gutter, said fastener means being engageable with a tool for applying an effort to move the fastener means to allow motion of the hook away from the clamping edge of the first clamping member, to release the rain gutter and including socket means on said first clamping member for removably mounting said key-operated lock in a position in which said element is disposed to prevent engagement of the tool with the fastener means, and a lip eccentrically carried on said lock movable by operation of a key in the lock between a first position in which said lip prevents separation of the lock from the first clamping member, and a second position in which said lip allows separation of the lock from the first clamping member.

9. A car-top sign carrier for mounting advertising material transversely on the roof of an automobile having a channel-shaped rain gutter extending along each lateral side of the roof, said carrier comprising:
  (a) a frame having a base;
  (b) a panel for displaying advertising material;
  (c) means on said frame for removably mounting said panel on said frame;
  (d) clamping means on each end of said frame engageable with the rain gutter on each side of the roof for supporting the panel in an upright position, each of said clamping means comprising:
     (1) a generally plate-like clamping member having a lower clamping edge engageable in the trough of the gutter and an opening adjacent said clamping edge;
     (2) means connecting the base of said frame to said clamping member so that the frame is in an upright position when the clamping member is disposed in an upstanding position in the rain gutter with its inner side facing toward the automobile and its outer side facing away from the automobile;
     (3) a strap member formed of a rigid matrial having a lower end bent into a hook, said strap member being receivable through the opening of the clamping member and normally supported with the hook below the clamping edge of the clamping member with the inner side of the hook being engageable with the lower side of the rain gutter, and movable toward and away from the clamping edge of the clamping member; and
     (4) fastener means movably mounted on the clamping member and connected to the opposite end of the strap on the inner side of the clamping member, said fastener means being operable by a first motion to move the hook toward the clamping edge of the clamping member to clamp the rain gutter between the clamping members and by a second motion to allow the hook to be moved away from the clamping edge of the clamping member for separation from the rain gutter.

10. A car-top sign carrier as defined in claim 9, including key-operated means on said clamping member having an element operative to prevent the second motion of said fastener means.

11. A sign carrier as defined in claim 10, wherein said fastener means are engageable by a tool for the application of an effort that is effective to produce the second motion, and wherein the element on said lock is operable to prevent engagement of the fastener means by the tool.

12. A sign carrier of claim 11, in which said key-operated means comprises a lock having a cam carried on one end of the lock and an opening on its other end for receiving a key, said cam being movable with respect to the lock by rotation of the key in the lock between first and second positions, and a socket in the clamping member for mounting the lock in a position in which portions of the cam are disposed to prevent engagement of the fastener means by the tool, said lock being removable from the socket when the cam is in its first position with respect to the lock, and the cam preventing removal of the lock from the socket when it is in its second position with respect to the lock.

13. A sign carrier of claim 9, wherein said frame comprises an elongated base member having a length substantially corresponding to the transverse distance between the rain gutters on the automobile, and a pair of side members fixed to one side of the base in longitudinally spaced relationship, said side members having opposed channel sections for receiving the side edges of said panel, and channel means on the base between said side members, said channel means being disposed to receive the lower edge of said panel so that the two side members and the base cooperate in supporting the panel in an upright position when the clamping means are engaged with the rain gutters of the automobile.

14. A carrier for securing an article above the roof of a vehicle having edge portions extending along each lateral side of the roof, comprising:
  a frame;
  means securing one end of said frame to a first of said edge portions;
  a first clamping member connected to the other end of said frame and engageable with the second edge portion;
  a second clamping member having a clamping section engageable with the second edge portion and operatively connected to said frame for motion between a first position in which the second clamping member cooperates with the first clamping member to attach the first clamping member to the second edge portion, and a second position in which the second clamping member allows the first clamping member to be detached from the second edge portion;
  fastener means operatively connected between said second clamping member and said frame for maintaining said second clamping member in said first position; and
  a key-operated lock associated with said frame for motion between a first position in which said lock engages said fastener means for preventing motion of said fastener means and said second clamping member from its first position when engaged with said second edge portion, and a second position in which said lock is disengaged from said fastener means.

References Cited
UNITED STATES PATENTS 3,132,780  5/1964  Binding.
3,239,115  3/1966  Bott et al.

ROBERT G. SHERIDAN, Primary Examiner

U.S. Cl. X.R.
40—129; 70—229

UNITED STATES PATENT OFFICE
CERTIFICATE OF CORRECTION

Patent No. 3,525,461            Dated Aug. 25, 1970

Inventor(s) J. Bronson

It is certified that error appears in the above-identified patent and that said Letters Patent are hereby corrected as shown below:

IN THE SPECIFICATION

Column 2, line 38, delete "rock" and insert --hook--

Column 7, line 24, delete "matrial" and insert --material--

SIGNED AND SEALED
NOV 24 1970

(SEAL)
Attest:

Edward M. Fletcher, Jr.
Attesting Officer

WILLIAM E. SCHUYLER, JR.
Commissioner of Patents